United States Patent [19]

Chang

[11] Patent Number: 4,667,608
[45] Date of Patent: May 26, 1987

[54] RUBBISH TREATING APPARATUS

[76] Inventor: Ming C. Chang, No. 209, Fu-Hsing Road, Hsin Ying City, Tainan Hsien, Taiwan

[21] Appl. No.: 878,253

[22] Filed: Jun. 25, 1986

[51] Int. Cl.$^4$ ............................................. F23J 15/00
[52] U.S. Cl. .................................. 110/215; 110/216; 110/222; 110/223; 110/224
[58] Field of Search .................. 110/218–224, 110/235, 215–216

[56] References Cited

U.S. PATENT DOCUMENTS

| | | | |
|---|---|---|---|
| 2,148,447 | 2/1939 | Dundas et al. | 110/224 |
| 3,572,264 | 3/1971 | Mercer | 119/215 |
| 3,584,587 | 6/1971 | Siracusa | 110/222 |
| 3,613,564 | 10/1971 | Adamski | 110/223 |
| 3,745,939 | 7/1973 | Allbritton | 110/216 |
| 3,826,208 | 7/1974 | Williams | 110/224 |
| 3,884,162 | 5/1975 | Schustter | 110/215 |
| 3,995,567 | 12/1976 | Drake et al. | 110/216 |
| 4,121,524 | 10/1978 | Voelskow et al. | 110/220 |
| 4,270,470 | 6/1981 | Barnett et al. | 110/222 |
| 4,553,285 | 11/1985 | Sachs et al. | 110/223 |

*Primary Examiner*—Henry C. Yuen
*Attorney, Agent, or Firm*—Morton J. Rosenberg

[57] ABSTRACT

A rubbish treating apparatus in which the rubbish is gathered, separated, and crushed, after that the crushed rubbish is transferred to a magnetic conveyor, such that ferro-metallic rubbish and non ferro-metallic rubbish are separated. The non ferro-metallic rubbish is then transferred to a pressing device in which the rubbish is pressed, and finally the rubbish is further crumbled and burned in a burner. The gas produced while burning is purified, therefore such procedure can be used to solve the problem of pollution due to rubbish.

1 Claim, 14 Drawing Figures

RUBBISH TREATING APPARATUS

BACKGROUND OF THE INVENTION

Pollution due to rubbish is indeed a serious problem in today's society. Conventionally, rubbish is usually buried, however, a vast area for burial is needed, moreover, the decaying of rubbish under the ground may arise other serious pollutions, such as water pollution and etc. As a result, a better way of solving such problem is a tough job so that better living environment can be preserved.

SUMMARY OF THE INVENTION

An object of the present invention is to provide a rubbish treating apparatus which is easily assembled and automatically treating the rubbish in a series of procedures.

It is another object of the present invention to provide a rubbish treating apparatus to completely solve the pollution caused by the rubbish.

It is still another object of the present invention to provide a rubbish treating apparatus which enable to recover the ferrous-metals in the rubbish, so that such rubbish pollution can be minimized.

The invention will now be specifically described with reference to the accompanying drawings.

DETAILED DESCRIPTION OF THE INVENTION

Figure 1:
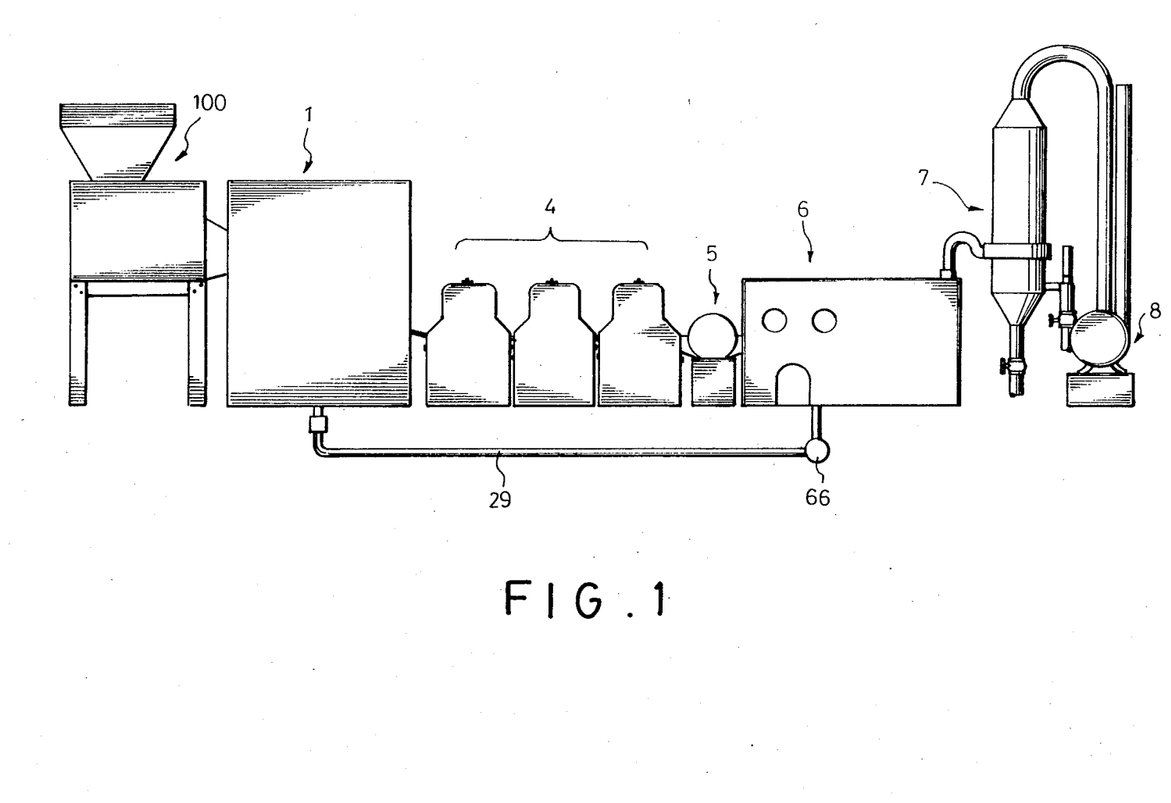
FIG. 1 is a schematic view of the apparatus in accordance with the present invention.
Figure 2:
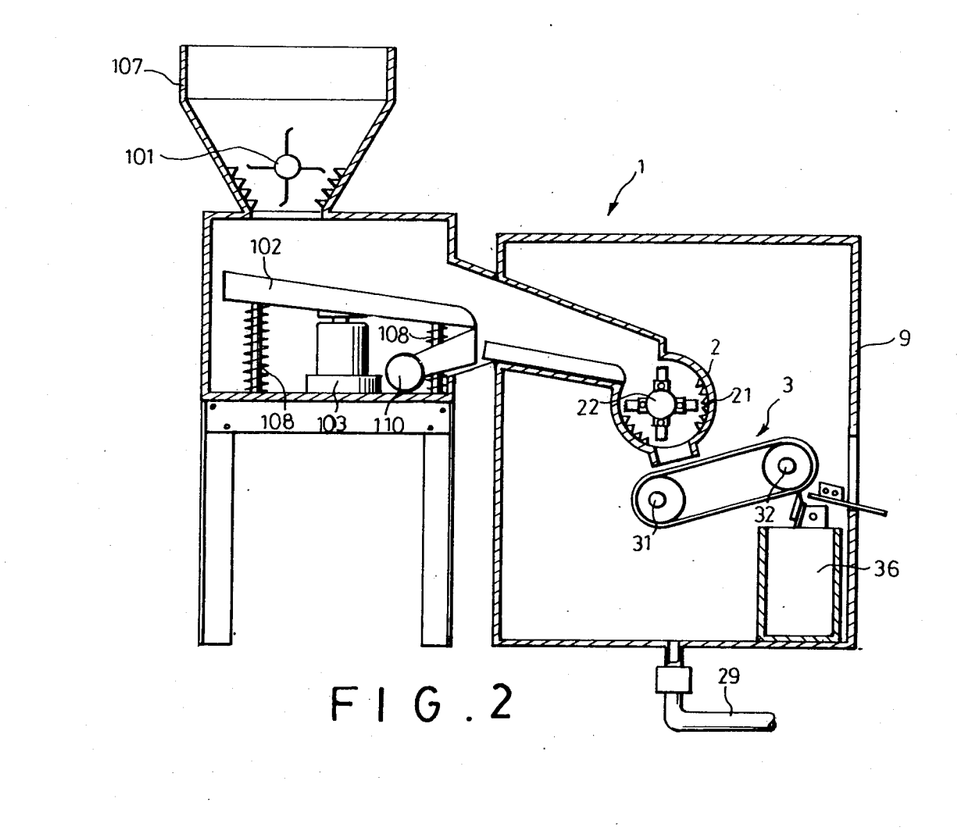
FIG. 2 is a schematic view of the crumbling device with rubbish feeding means.
Figure 3:
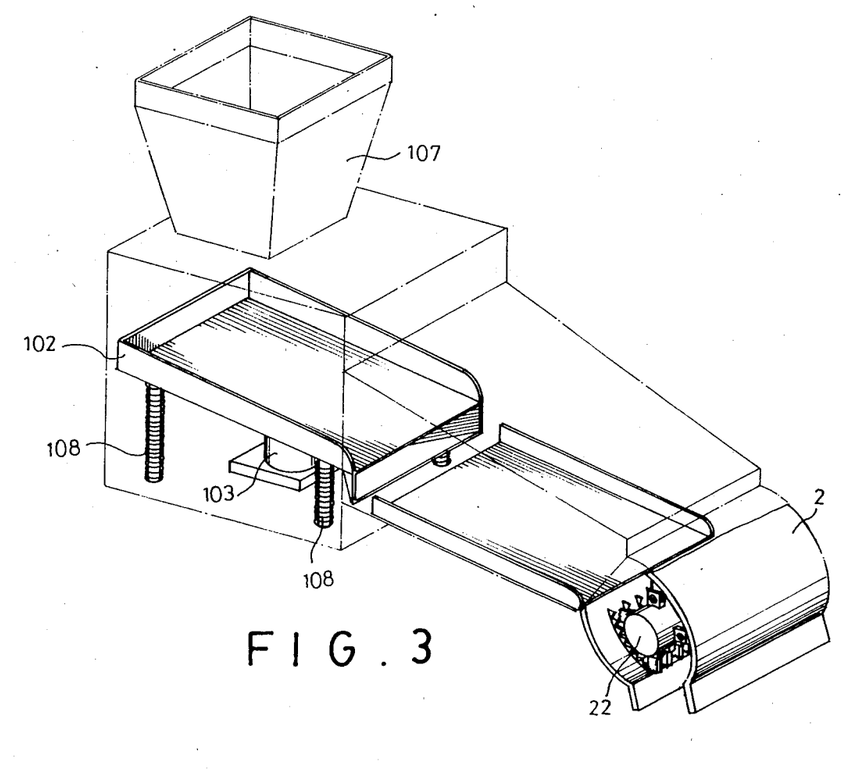
FIG. 3 illustrates the perspective of rubbish feeding means.
Figure 4:
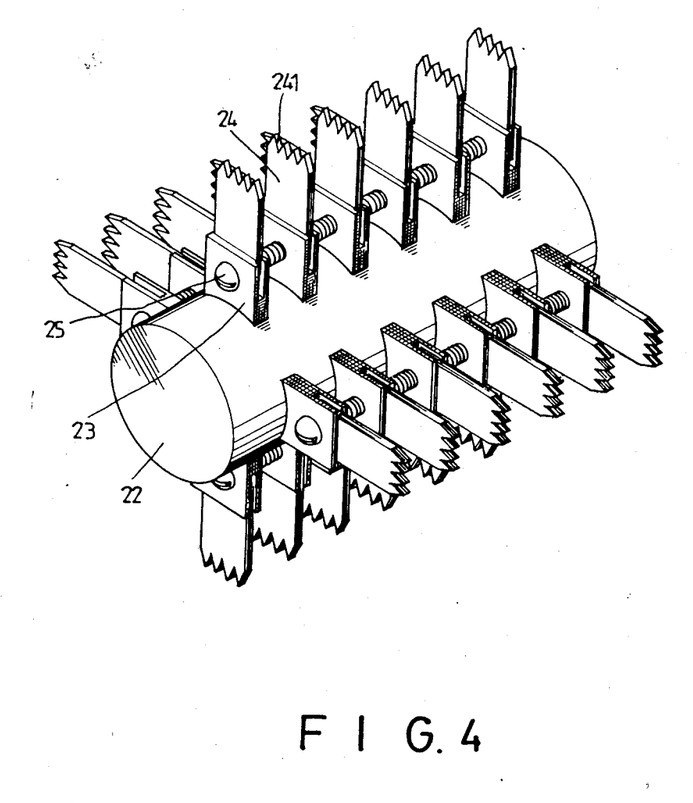
FIG. 4 illustrates the structure of the rotating shaft of the crumbling device.
Figure 6:
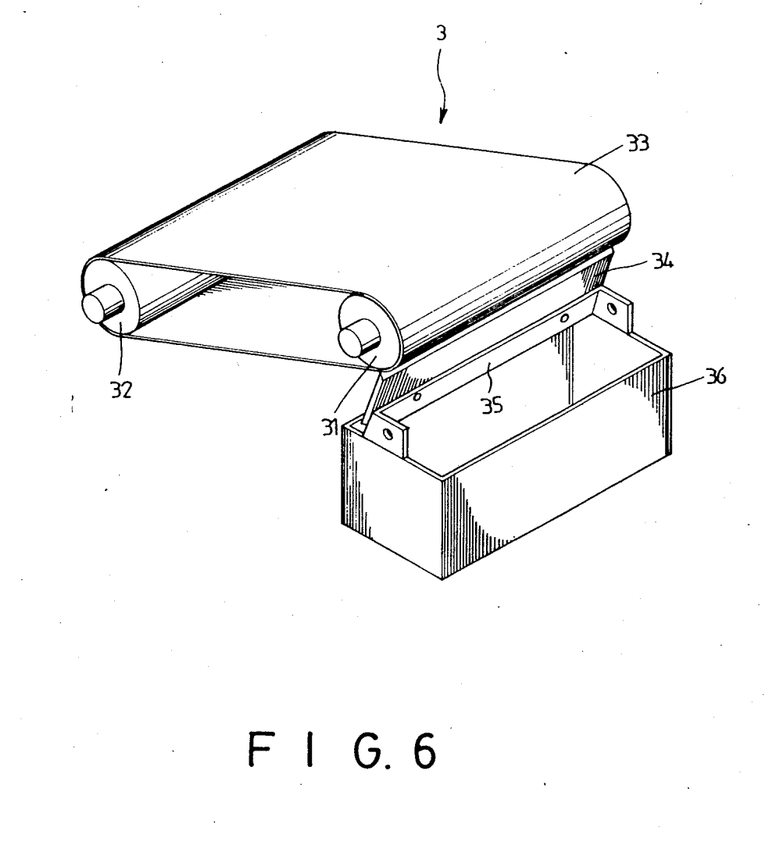
FIG. 6 is a perspective view of the magnetic conveyor in accordance with the present invention.

FIG. 1 schematically illustrates the arrangement for treating rubbish such that no pollution to the environment will occur. The present arrangement essentially comprises a rubbish separator (1) with feeding means (100), crumbling means (2), magnetic conveyor (33), pressing means (4), blower (5) burner (6), polluted air treating means (8) and ventilator (8), wherein the crumbling means (2) and magnetic conveyor (33) are arranged within a housing (9) of the rubbish separator (1). Referring to FIG. 2, the rubbish feeding means (100) is disposed beside the housing (9) and said feeding means (100) is comprising of a rotating element (101) within a hopper (102), the element (101) is rotated by a driving mechanism (not shown), a slanting platform (102) is disposoed underneath of said hopper (107). The slanting platform (102) is vibrated by a vibrating means (103) which supports by reinforced springs (108) (109) at two ends, so that the rubbish dropped onto said platform (102) can be transferred to the crumbling means (2). With the aid of a blower (110), the rubbish can easily be transferred to the crumbling means (1). Referring to FIG. 2 and FIG. 3, the crumbling means (2) comprises a housing which is internally comprises with a plurality of teeth (21), and a rotatable shaft (22) is located within the housing. Please refer to FIG. 4, on the surface of rotatable shaft (22), plurality of fixing sockets (23) are arranged orderly, such that toothed-blade (24) with teeth (241) can be tightened with screws (25) such that these toothed-blade (24) can be replaced if desire. When the shaft (22) is rotated, the combination of toothed-blade (24) and the teeth (21) within the internal of the housing works on rubbish together and crumble the rubbish into smaller pieces, after that, the rubbish is transferred on to the conveyor (33) (shown in FIG. 6) which is directly beneath the crumbling means (2). As the rotation of the rotatable shaft (22) is slow, the toothed blade (24) can be actuated which prevent said toothed-blade (24) from damage by hard metals in the rubbish. A conduit (29) is disposed at the bottom of separator (1) and connected to a burner (6).

Figure 5:
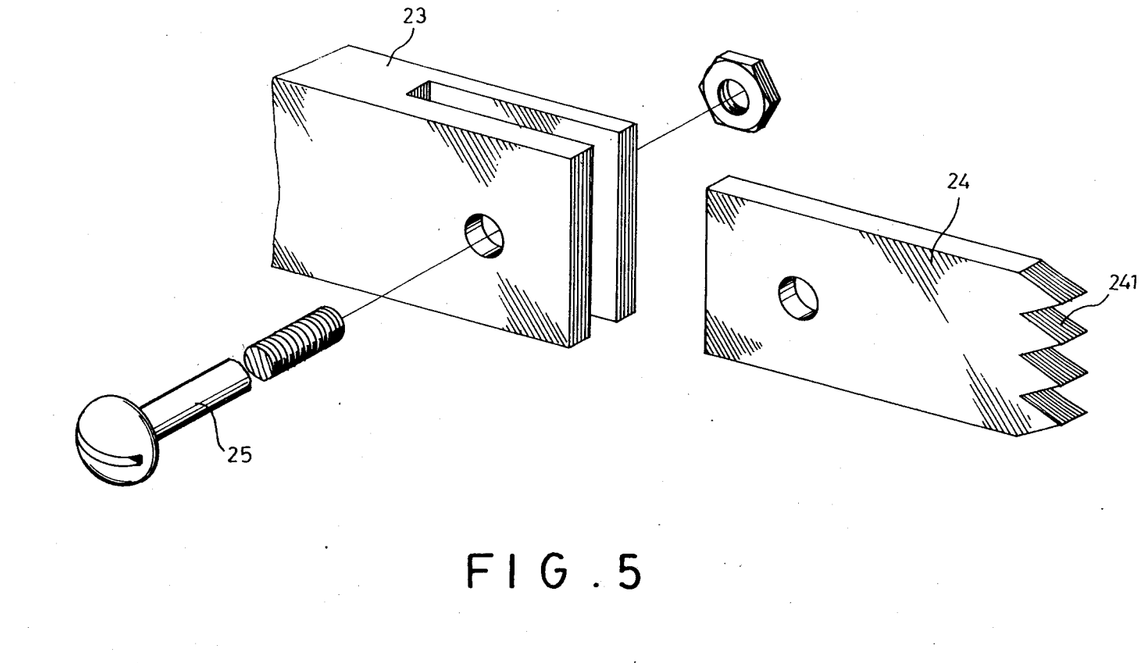
FIG. 5 illustrates the toothed-element of the rotating shaft, in accordance with the present invention.

Referring to FIG. 5, a conveying means (3) comprises a magnetic wheel (31), a non-magnetic wheel (32), a conveyor (33), a scraper (34), a fixing seat (35) and a container (36); wherein the conveyor (33) is a closed course around the magnetic wheel (31) and non-magnetic wheel (32). The (33) is moved closewise by the wheels (31) (32), so that the crumbled rubbish can be transferred to the pressing means (4). A rectangular scraper (34) is secured to the seat (35) on the top of container (36) so that the ferrous metal on the magnetic conveyor belt (33) may be scraped and collected in the container (36), as a result the non-ferrous metal will be transferred to the pressing means (4) by the conveyor belt (33) through a grooved plate (37), which is secured at housing (9) on one end. The grooved-plate (37) is arranged in a slanting position which faciliate the non-ferrous rubbish to slide down into the pressing means (4).

Figure 7:
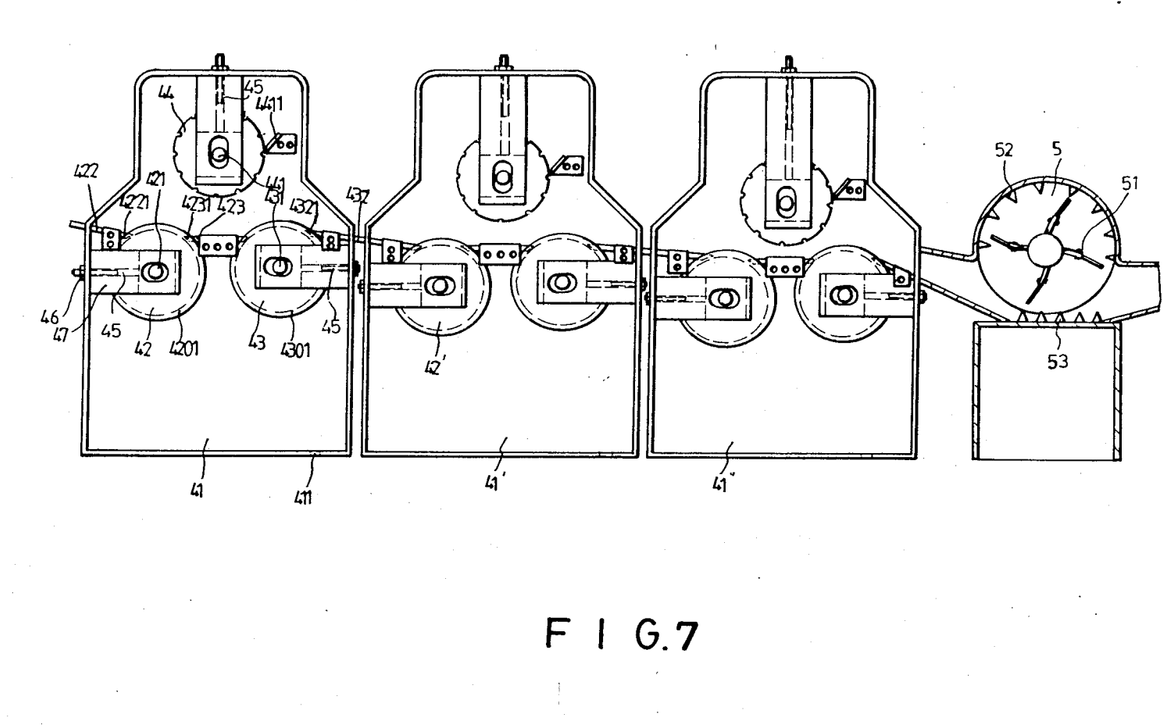
FIG. 7 is a schematic view of the pressing means with a blowing means which arrange in a series in accordance with the present invention.
Figure 8:
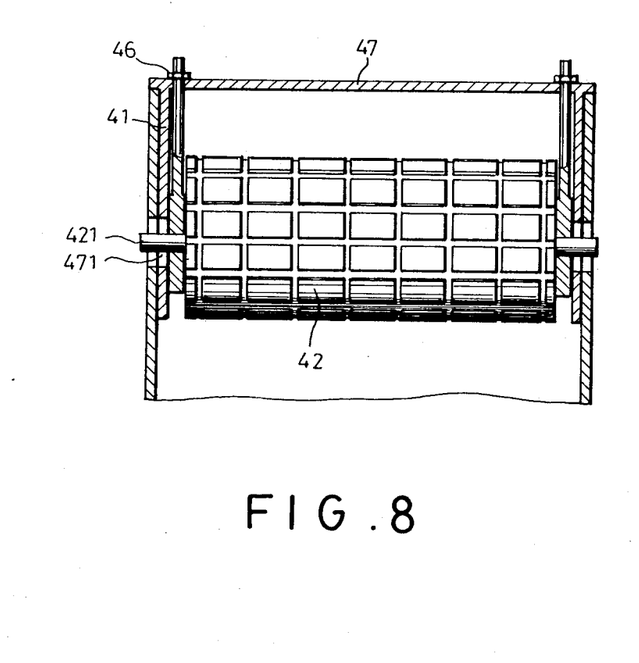
FIG. 8 illustrates the top view of the roller of the pressing means.
Figure 9:
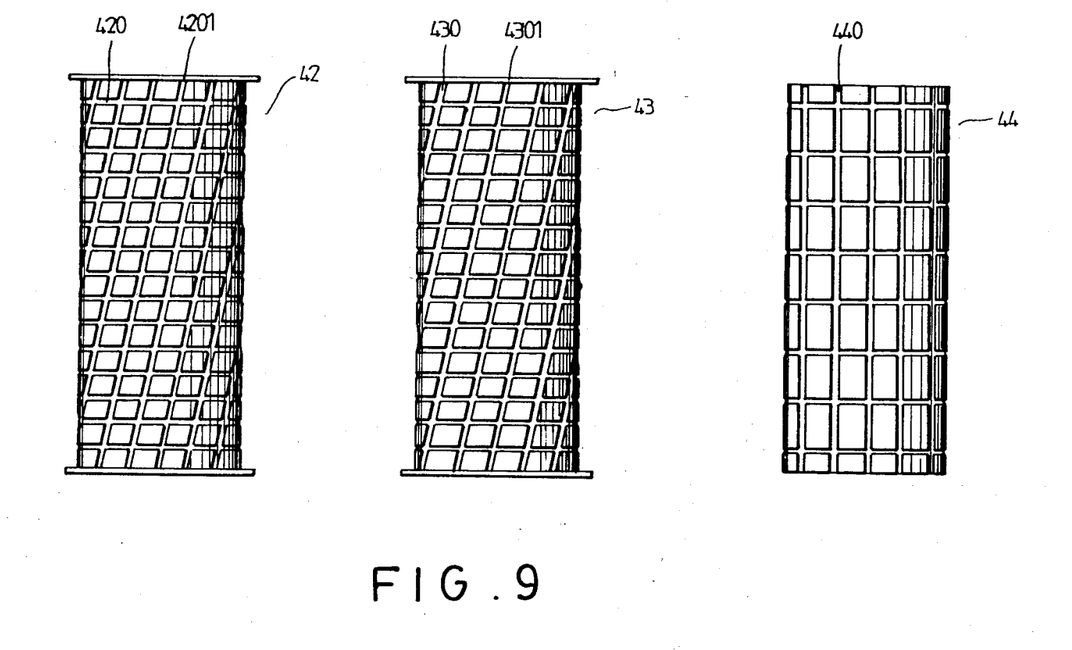
FIG. 9 illustrates the various design pattern of the surface of the roller.

As shown in FIG. 1 and FIG. 7 there are three pressing machines (41)(41')(41") arranged in series; each pressing machine is comprises of three roller (42) (43) (44) which is driven by motor (not shown). The axles (421) (431) (441) of rollers (42) (43) (44) respectively mounted at one end of a bar (45), and by means of screw and nut (46), they are secured to a support (47), while the support (47) is welded to the housing of the pressing machine (41), as a result, by adjusting the nut (46), and hence the space (471) (refer to FIG. 8) of roller (42) (43) (44) can be controlled. Along the edge of rollers (42) (43) (44), scraper (4221) (4231) (4421) are respectively provided so as to scrape the rubbish stick on the rollers (42) (43) (44). The rubbish from the conveyor means (3)

is pressed and squeezed by rollers (42) (43) (44). This procedure is continued for a period of time before the rubbish is transferred to the blower (5). Referring to FIGS. 8 and 9 which illustrate various pattern of the surface of rollers (42) (43) (44). In one preferred embodiment, on the surface of rollers (42) (43) (44), grooves (420) (430) (440) are provided along the edge (4201) (4301) of roller (42) (43) (44) such that polluted-water may be collected along the edges (4201) (4301).

Figure 10:
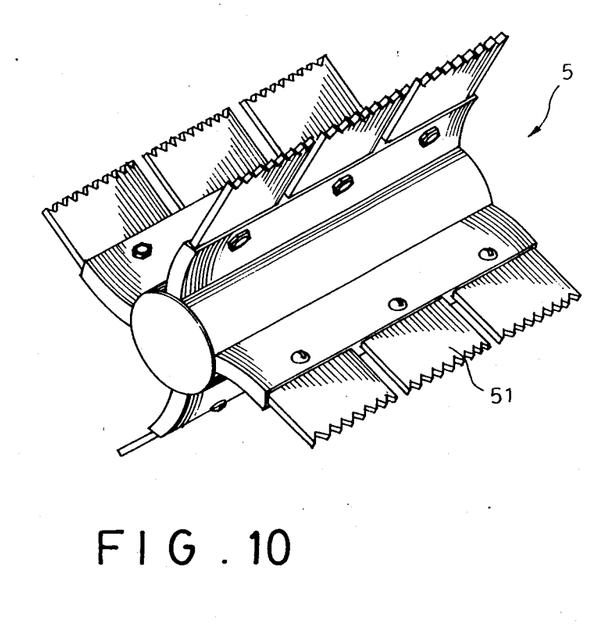
FIG. 10 illustrates the perspective view of shaft and blades of blowing means.

Referring to FIG. 10 which illustrates the shaft of blower (5) with detachable blade (51). Then the crumbled and pressed rubbish from the pressing means (4) enters the blower (5), which is further crumbled and transfer to a burner (6) and burn into ash.

Figure 11:
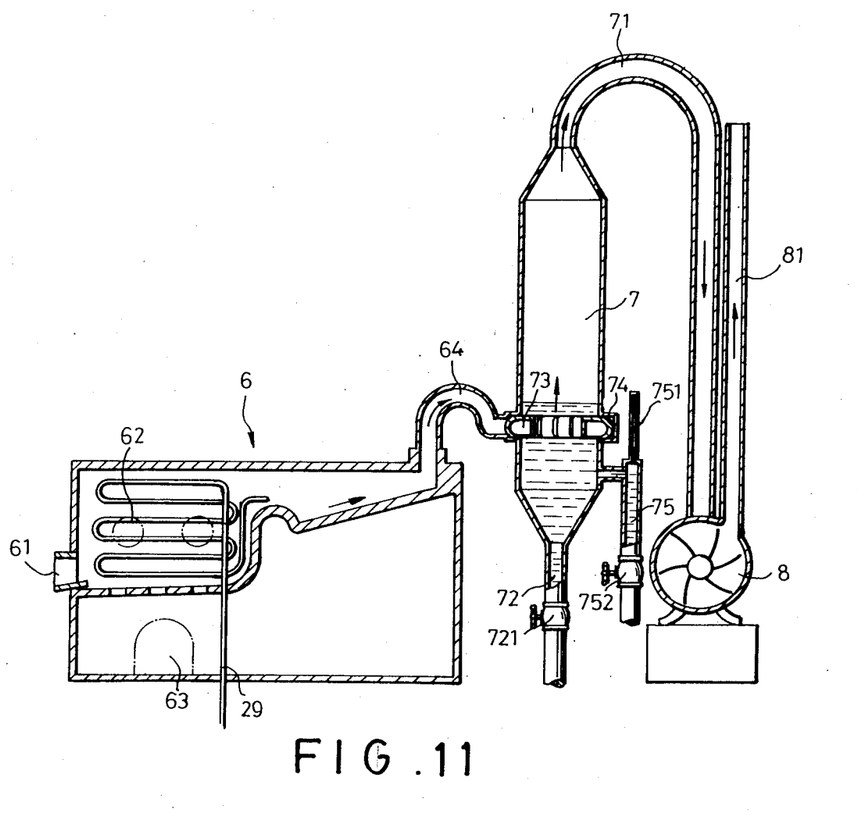
FIG. 11 shows schematic view of a burner, a polluted air treating means and a blower arranged in series in accordance with the present invention.
Figure 12:
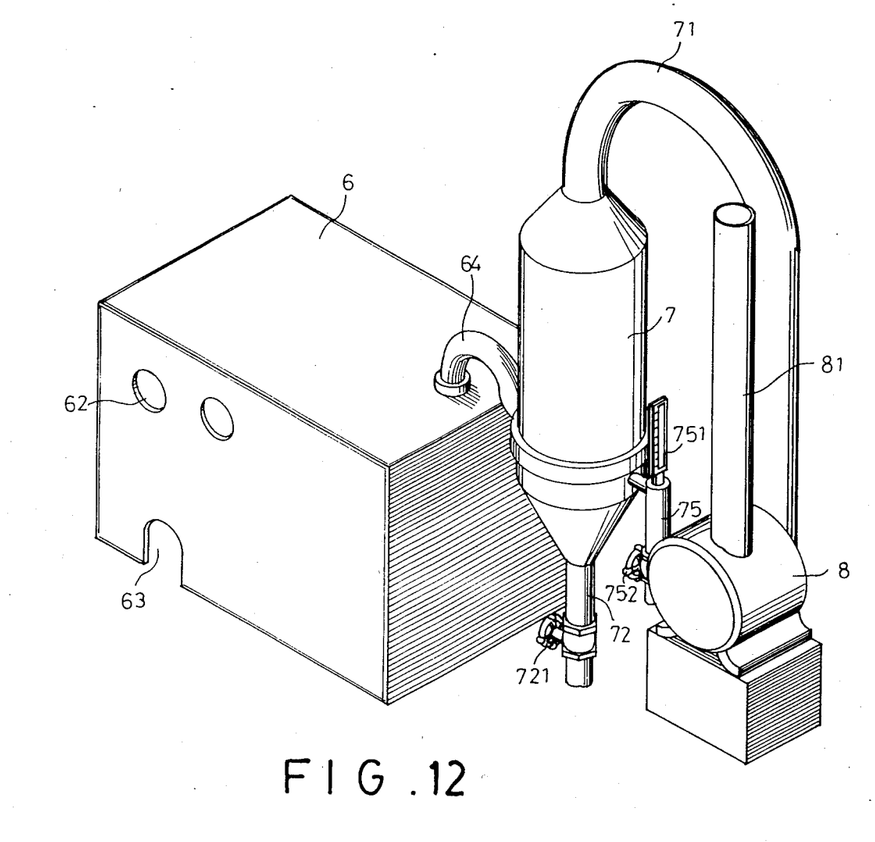
FIG. 12 shows perspective view of a blower, a polluted air treating means and a blower arranged in series in accordance with the present invention.
Figure 13:
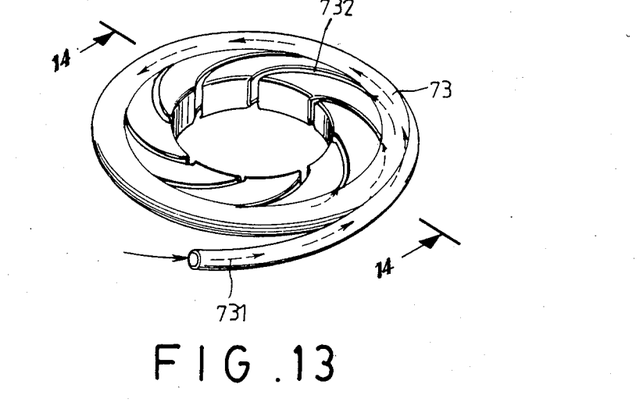
FIG. 13 shows a perspective view of filter disc in accordance with the present invention.
Figure 14:
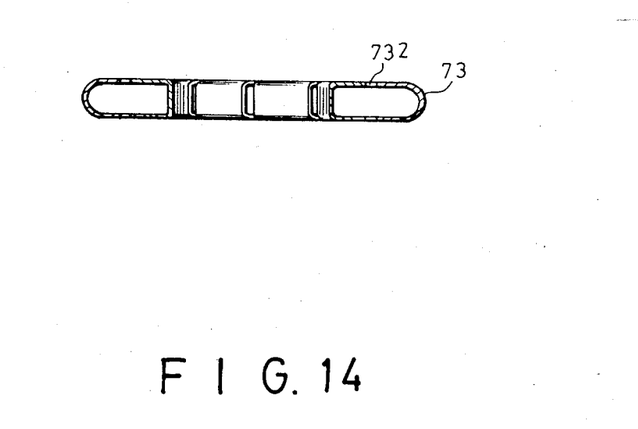
FIG. 14 shows a cross-sectional view along 1—1 of filter disc in FIG. 13.

Referring to FIG. 11 and FIG. 12. The burner (6) has a rectangular shaped with an inlet (61). Where rubbish from the blower (5) passes through said inlet (61) and burn within the burner (6). There are two circular apertures (62) for directing fire in order to burn the rubbish. These apertures (62) also provide ventilation when burning. Pulluted water from the separator is pumped by pump (66) and it is evaporated at this stage. The ash, after burning is collected at outlet (63). At one corner of the burner (6), a waste gas release outlet (64) is connected in order to transfer the waste gas (after burning) to a waste gas treating device (7).

At the waste gas treating device(7), the waste gas can be purified and release. Such device(7) has a rocket shaped wherein both ends are tapered. At one of its end, a exhausting pipe (71) is in connection with a ventilator (8) while the other end is connected with a pipe (72) for releasing the polluted water. A control value (721) is disposed at somewhere along the pipe (72). A water supplying pipe (75) is provided to the lower portion of said treatment device (7). A water level indicator is provided within the water supply pipe (75) so that the water level in the treating device (7) can be observed and the level is always keep below the level of filter disc (73); the inlet of water supply is provided with a water controlling valve (752) to control the flowrate of water into the treating device (7). The waste gas after releasing from the burner (6) will enter the waste gas treating device (7) through a filter plate (73). Please refer to FIG. 11, the waste gas mixed with the water in the waste gas treating device if the gas flows through pipe (731) and move in a circular direction. After mixing, the purified gas is evolved through releasing pipe (71) and by means of a ventilator (8), the clean gas is evolved into the atmosphere.

I claim:

1. A rubbish treating apparatus comprising:
   (a) a rubbish separator with feeding means which includes a hopper as an inlet for rubbish, a slanting platform which is operated by a motor, a blower such that the rubbish can be blown towards a crumbling means;
   (b) a crumbling device including a housing with a plurality of teeth internally mounted within the housing, rotating shaft and toothed-blades which crumbles the rubbish into smaller pieces, said toothed-blade being detachably mounted to the shaft;
   (c) a conveyor unit, which is mounted directly beneath the crumbling device, and comprises a ferrous metal wheel, a non-ferrous metal wheel, a conveyor, scraper, fixing seat and container; wherein, the conveyor is a closed course and around the wheels, said conveyor is driven when the wheels are rotated, and the scraper is secured at said fixing seat which directly below the conveyor, said scraper scrapes up the ferrous metallic rubbish and collected in the container;
   (d) pressing means which comprises three identical pressing machines, each maching includes three rollers and the rollers are mounted at a seat which is welded to the internal wall of said pressing machine; the surface of the roller is arranged with various groove patterns, scrapers are provided along the surface of the roller to take up pressed rubbish; a further blower is disposed at the final pressing machine;
   (e) a burner, which arranged next to said blower, and a conduit is mounted within the burner for evaporation of water contained therein;
   (f) a waste gas treating unit which dispose beside said burner having two tapered ends, a funnel is located at the top of the treating unit, while the bottom of treating unit is disposed with a pipe having a valve mounted thereon, a hollow circular filter disc is disposed near to the bottom of the treating unit, two apertures are provided at both ends of filter disc while filter disc is connected to the waste gas outlet of burner, along the treating unit a T-shaped water pipe is disposed in which a water level indicator is provided at one end and a control valve is disposed at the other end to control the flowrate of water; and,
   (g) a ventilation fan arranged next to the waste gas treating unit which includes an inlet and an outlet.

* * * * *